United States Patent [19]

Wessel et al.

[11] 4,365,605
[45] Dec. 28, 1982

[54] APPARATUS FOR IMPROVING THE ACCELERATION OF AN INTERNAL COMBUSTION ENGINE DRIVEN WITH AN EXHAUST TURBOCHARGER

[75] Inventors: Wolf Wessel, Oberriexingen; Wilfried Sautter, Ditzingen; Johannes Brettschneider, Ludwigsburg, all of Fed. Rep. of Germany

[73] Assignee: Robert Bosch GmbH, Stuttgart, Fed. Rep. of Germany

[21] Appl. No.: 200,654

[22] Filed: Oct. 27, 1980

[30] Foreign Application Priority Data

Oct. 31, 1979 [DE] Fed. Rep. of Germany ....... 2943950

[51] Int. Cl.³ .............................................. F22B 37/10
[52] U.S. Cl. ....................................... 123/502; 73/116
[58] Field of Search ...................... 73/116, 118, 117.3; 123/502, 501, 492, 370, 422

[56] References Cited

U.S. PATENT DOCUMENTS 3,968,779  7/1976  Davis .............................. 123/502 X Primary Examiner—Jerry W. Myracle
Attorney, Agent, or Firm—Edwin E. Greigg

[57] ABSTRACT

A method and apparatus for improving the acceleration behavior of a self-igniting internal combustion engine driven with an exhaust turbocharger by displacing the onset of injection during the acceleration phase toward "early", and a combustion chamber pressure is attained, which at least in part compensates for reduction in engine power caused by sluggishness of the turbocharger and a resultant smaller cylinder charge. Further increase in power is attained by means of an increase in the fuel component made possible by the adjustment of injection onset without exceeding the smoke limit of combustion. Apparatus are furthermore proposed for performing the method according to the invention, in which with the aid of an acceleration signal obtained by hydraulic or electric elements an adjustment toward "early" is effected in a hydraulically functioning injection adjustment device.

20 Claims, 6 Drawing Figures

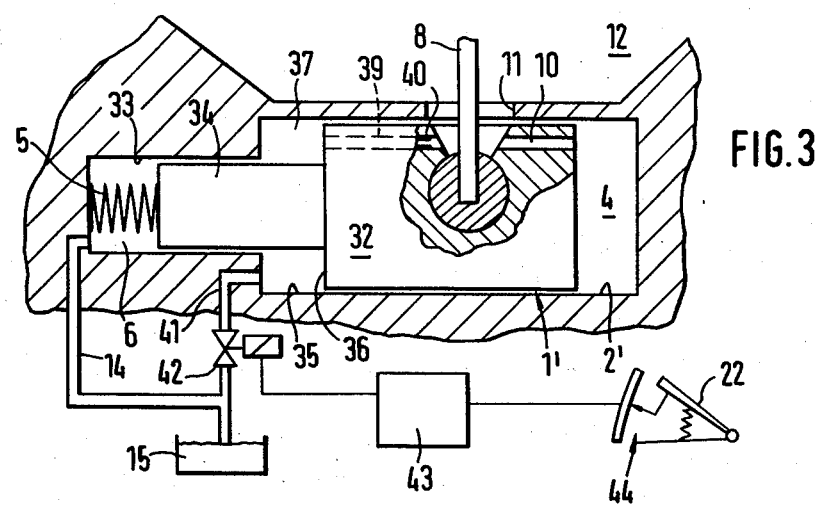

APPARATUS FOR IMPROVING THE ACCELERATION OF AN INTERNAL COMBUSTION ENGINE DRIVEN WITH AN EXHAUST TURBOCHARGER

BRIEF DESCRIPTION OF THE INVENTION

The invention relates to a method and apparatus as described by the the main claim.

BACKGROUND OF THE INVENTION

In an internal combustion engine equipped in this manner, there is the severe disadvantage of low acceleration capacity out of low rpm or low load conditions, in comparison with the power produced by the supercharging. In present-day city traffic, vehicles equipped with turbochargers can be a significant hindrance. During acceleration, pressures of 0.8 –0.9 bar (absolute pressure), for example, are brought about in the intake tube area between the turbocharger and the combustion chamber either by the throttling effect of the turbocharger, which at the moment of acceleration is still functioning slowly, or by the inertial moment of the turbocharger. As a result, the engine is supplied with an insufficient amount of air in these operational ranges.

In a known engine that is described in German Offenlegungsschrift 27 18 630, which is also equipped with a manifold-pressure compensator in order to maintain smoke-free combustion, the full-load quantity is limited by the manifold-pressure compensator to a very low value during the acceleration phase. In order to improve acceleration capacity in this engine, the actuation speed of the accelerator pedal, which expresses the driver's intention for acceleration, is ascertained as a control variable and the full-load stop is briefly adjusted in accordance with this control variable, via the manifold-pressure compensator. The accelerator pedal actuates a pump whose work chamber communicates via a check valve with the work chamber of the manifold-pressure compensator. This latter work chamber is uncoupled relative to the charge pressure withdrawal point by means of a throttle, while a further throttle is provided upstream of the check valve, by way of which the air supplied by the pump can escape either entirely or in part depending on the adjustment speed of the accelerator pedal.

OBJECT AND SUMMARY OF THE INVENTION

The method and apparatus according to the invention having the characteristics of the main claim has the advantage that an increase in torque can be attained without first having to increase the fuel component relative to the induced air quantity, which would otherwise involve the danger of at least briefly exceeding the smoke limit.

Pressure increases in the combustion chamber, which are effected by the early onset of injection and are associated with increased noise, can be taken into account during the brief period of acceleration in a manner similar to the closer approach to the running limit in the above-described known engine. During subsequent, essentially stationary operation of the engine, the optimal values for injection onset are maintained.

As a result of the characteristics disclosed in the dependent claims, advantageous improvements to and modifications of the method disclosed in the main claim are obtained, as well as advantageous apparatus for performing the method.

The invention will be better understood and further objects and advantages thereof will become more apparent from the ensuing detailed description of three preferred embodiments taken in conjunction with the drawings.

BRIEF DESCRIPTION OF THE DRAWINGS

FIG. 3 shows somewhat schematically a second exemplary embodiment of the invention having an injection adjuster which takes the form of a stepped piston having compensation work chamber controllable via a relief valve;

FIG. 4 shows one form of embodiment of the relief valve;

FIG. 5 diagrams in the form of a plot diagram the course of the exhaust pressure upsteam of the turbine of the exhaust turbocharger in accordance with time over the course of one instance or interval of acceleration; and FIG. 6 shows schematically a third exemplary embodiment of the invention having a controllable manifold-pressure compensator.

DETAILED DESCRIPTION OF THE PREFERRED EMBODIMENTS

The torque available in a self-igniting internal combustion engine for the purpose of accelerating a vehicle driven with a combustion engine is limited, especially by the permissible extent of smoke buildup in the exhaust gas. Smoke development in the exhaust gases is dependent first on the fresh-air quantity delivered to the engine and second on the injected fuel quantity—that is, on the air number $\lambda$. Smoke development is furthermore dependent on the relative position of the onset of injection to top dead center. Smoke-free operation of a self-igniting engine is an extremely important goal. If such an engine is now operated with an exhaust turbocharger, then when the engine is supposed to be brought from relatively low rpm to higher rpm, that is, during acceleration, the inertia of the exhaust turbocharger causes the pressure in the intake tube between the exhaust turbocharger and the engine to drop to 0.8 –0.9 bar. However, this in turn means that there is a relatively small quantity of air available to the engine, and in order not to exceed the smoke limit only an equally limited fuel quantity can be injected into this quantity of air. The reduction of the charge precisely during acceleration has a very negative effect on the acceleration of vehicles equipped with engines of this kind.

Figure 1:
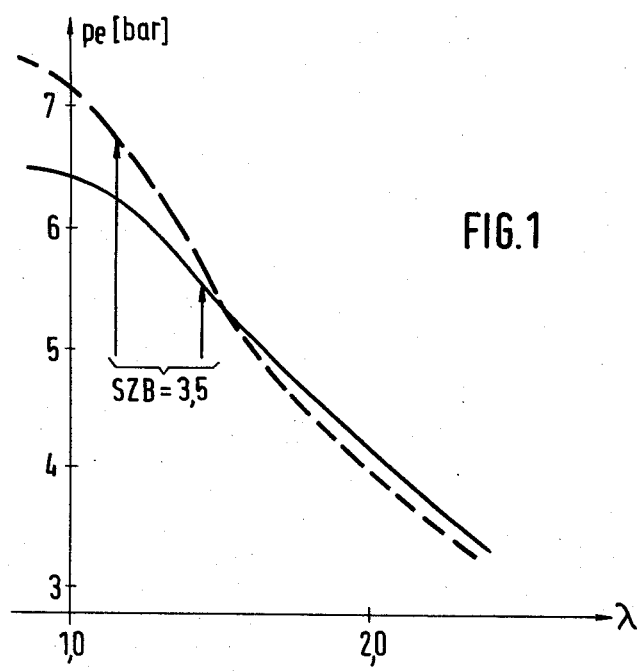
FIG. 1 shows the course of combustion chamber pressures at two different times for injection onset, plotted over the air number $\lambda$.

Referring now to the drawings, there is shown in FIG. 1 the interrelationship of the average combustion-chamber pressure, the air number $\lambda$, and the onset of injection. In this instance, the measurement was made at 1000 rpm and an intake tube pressure of 0.9 bar—that is, the condition where the engine is to be accelerated out of an idling rpm, for instance. The solid line represents the course of the average combustion-chamber pressure over the air number $\lambda$ for an injection onset at 10° before top dead center, while the broken line represents the course of pressure at 20° before top dead center.

The arrows variously indicate the point at which the permissible smoke limit is exceeded, which is in the order of magnitude of a (Bosch) blackness number (SZB) of 3.5. It can clearly be seen that at the earlier injection onset a substantially higher average combustion-chamber pressure can be attained (with the same amount of smoke) and that the permissible blackness number is only exceeded after a further enrichment with fuel. However, it is a disadvantage that the steeper pressure increase with an earlier onset of injection has a deleterious effect on engine noise. Still, the periods during which the engine is in a state of acceleration as described above are relatively short, and so it is possible to approach the permissible threshold values much more closely than would be the case during substantially stationary operation of the engine, with the injection quantity and instant of injection being set for reliable, smokefree operation with low noise emission.

Figure 2:
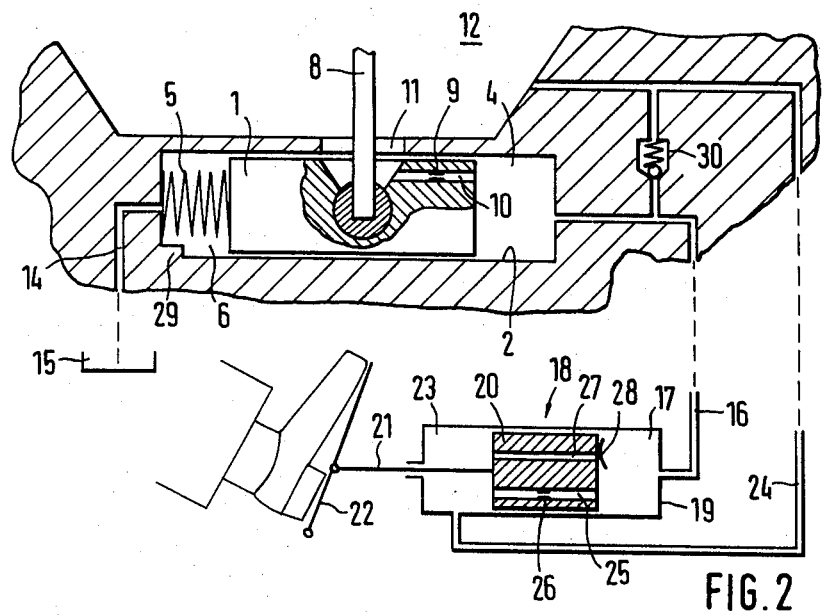
FIG. 2 shows schematically a first exemplary embodiment of the invention.

The temporary adjustment of the onset of injection during acceleration phases according to the invention can be effected by means of an embodiment as shown in FIG. 2. This figure shows the injection onset adjustment device of an injection pump, which is not shown in detail, having an injection adjustment piston 1 displaceably disposed in a closed cylinder bore 2 and on one end enclosing a control pressure chamber 4. On the other end, the injection adjustment piston 1 is under the influence of a restoring spring 5 disposed in a relief chamber 6 enclosed by the injection adjustment piston 1.

The injection adjustment piston 1 is connected in movable fashion with an adjuster arm 8 which actuates a supply onset device, not shown in detail, of the injection pump. In a known manner, the control pressure chamber communicates continuously via a line 10 containing a throttle 9 with a control pressure source having a pressure controlled in accordance with rpm. In many known embodiments of injection pumps, this control pressure source is the suction chamber of the injection pump. Then the line 10 can be disposed in the injection adjustment piston 1 itself, for instance, and can communicate with the suction chamber via an aperture 11 which is provided between the cylinder bore 2 and the suction chamber in order to displace the adjuster arm 8 into the suction chamber 12 of the injection pump. The relief chamber 6 serves to receive the quantity of leakage fuel which is carried back to the fuel supply container 15 via a relief line 14.

From the control pressure chamber 4, a connecting line 16 leads to a work chamber 17 of a pump device 18. The pump device 18 has a pump piston 20 in a closed cylinder 19, and the pump piston 20 is connected via an actuation rod 21 with the gas pedal 22. The pump piston 20, on one end in the cylinder 19, encloses the work chamber 17 and on the other end encloses a pressure chamber 23. The pressure chamber 23 communicates at all times via a pressure line 24 with the suction chamber 12 of the injection pump, that is, with the control pressure source. A first longitudinal bore 25 is provided in the pump piston 20, connecting the work chamber 17 with the pressure chamber 23. A first throttle 26 is located in the longitudinal bore 25. A second longitudinal bore 27 is also provided, which in like manner connects the work chamber 17 with the pressure chamber 23. A check valve 28 is disposed in this second longitudinal bore 27 or at one of its ends. The check valve 28 is preferably embodied as a flutter valve and it opens in the flow direction toward the work chamber 17.

The apparatus described functions as follows:

When the gas pedal 22 is moved in the direction of full load—that is, when acceleration is to be performed—the pump piston 20 is adjusted such that the volume of the work chamber 17 is reduced. During the adjustment movement, the check valve 28 is closed for a brief instant. This valve also responds to a very slow adjustment movement of the pump piston 20. If the fuel quantity forced out by the pump piston 20 is larger than the fuel quantity which can flow back into the pressure chamber 23 via the first throttle 26 in order to equalize pressure, then there is a pressure increase in the work chamber 17 and in the control pressure chamber 4. This increase in pressure causes a displacement of the injection adjustment piston 1 counter to the force of the restoring spring 5 and thus causes a shift of the onset of injection by the injection pump to a larger angle before top dead center or toward "early". Because the increased control pressure after the end of the adjustment movement of the pump piston 20 can be equalized via the first throttle 26 and the throttle 9, the injection adjustment piston 1 returns to its original position after a period of time determined either by the size of the throttles 9 and 26, the magnitude of the restoring force, or the amount of deflection of the injection adjustment piston 1. The process described represents a hydraulic differentiation of the speed of the change in load. At the same time, the adjustment force required for the injection adjustment piston 1 is generated by the movement of the gas pedal 22. The adjustment time is in direct proportion to the speed and dimension of the change in load. If the gas pedal 22 is retracted, that is, set for a smaller load, then the volumetric enlargement of the work chamber 17 is compensated for instantaneously via the second longitudinal bore 27, so that there is no influence exerted on the control pressure in the control pressure chamber 4.

The embodiment of the invention as described above very simply and reliably provides an apparatus with which the onset of injection can be shifted toward "early" during an instance of acceleration. After the expiration of the acceleration phase, the control of the injection adjustment piston 1 is effected in an unchanged, conventional manner, so that the injection onset values for normal, substantially stationary operation are not affected. The deflection of the injection adjustment piston 1 is limited by a stop 29. This is important for the case where several repeated pumping movements are performed with the pump piston 20. In order to avoid an impermissible increase of the pressure in the work chamber 17 and the control pressure chamber 4, a pressure-limiting valve 30 is also provided, which relieves the system comprising control pressure chamber 4 and work chamber 17 toward the suction chamber 12. This avoids the establishment of injection onset values located at an excessive distance before top dead center in case there is uncontrolled actuation of the gas pedal.

Naturally, the acceleration signal can be attained by electrical means in place of the hydraulic process described above. Then the gas pedal travel distance covered is differentiated and an adjustment of the injection adjustment piston 1 effected in accordance with the acceleration signal thus obtained by electric or electronic means. This can be applied in particularly advantageous fashion if the adjustment of injection onset is already effected electrically for normal operation, such as is described in German Offenlegungsschrift No. 22 10

400. In a system of this kind, a separate control adjustment can be made with the acceleration signal.

The acceleration signal naturally can be obtained at other locations in the system as well, for instance at the quantity adjustment device of the injection pump.

If the acceleration signal is obtained as an electrical signal, then the duration of the adjustment toward "early" of the injection adjustment piston 1 or of the onset of injection can be determined in an advantageous manner via a timing element. With this timing element, the inertial behavior of the turbocharger can be taken into account.

The first exemplary embodiment shown in FIG. 2 was realized with a purely hydraulic injection adjuster such as that found conventionally in a majority of injection pumps. The acceleration signal itself was used as the control variable, no substantial changes in the structure of the injection pump having been necessary. A different possibility for adjusting the instant of injection is shown in FIG. 3. There, a modified injection adjustment piston 1' is provided, which is embodied as a stepped piston. The piston section 32 having the larger diameter corresponds to the embodiment of the injection adjustment piston 1 in FIG. 1. As in FIG. 1, it encloses in a corresponding cylinder bore 2' a control pressure chamber 4, which communicates at all times with the suction chamber 12 of the injection pump via a line 10 in the piston section 32 and via the aperture 11. The adjuster arm 8 is also coupled with the piston section 32. However, in this instance, the cylinder bore 2' is embodied as a stepped cylinder bore, while the cylinder bore section 33 having the smaller diameter serves to receive the correspondingly smaller stepped piston section 34. Within the cylinder bore section 33, this piston section 34 encloses the relief chamber 6, which communicates via the relief line 14 with the fuel supply container 15. As in the foregoing embodiment, the restoring spring 5 is disposed in the relief chamber 6, here acting upon the smaller stepped piston section 34. An annular compensation work chamber 37 is enclosed in the larger stepped bore section 35 between the end face 36 of the larger stepped piston section 32 remote from the control pressure chamber 4 and the smaller stepped piston section 34. This compensation or relief work chamber 37 communicates at all times with the suction chamber 12, or with the control pressure source in general, via a bore 39 containing a throttle 40. The bore 39 may extend, for instance, in the larger stepped piston section 32 and, similarly to the line 10, may communicate with the suction chamber 12 via the aperture 11. From the compensation work chamber 37, a second relief line 41 also leads to the fuel supply container 15. A valve 42 is disposed in the second relief line 41, being embodied here as a magnetic valve. The magnetic valve is triggered by a control device 43, which receives as its control signal a voltage change signal obtained at the gas pedal 22. This may be effected, for instance, via a potentiometer coupled with the gas pedal 22.

The apparatus functions as follows:

First, in a known manner, the rpm-dependent control pressure is fed into the control pressure chamber 4 via the line 10 and the injection adjustment piston 1' is accordingly displaced counter to the force of the spring 5 until such time as there is a balance of forces on the piston 1'. When the valve 42 is closed, the effective surface area is the area of the end face on the side toward the control pressure chamber minus the area of the end face 36 on the side toward the relief chamber 6. The relief work chamber communicates at all times via the throttle 40 with the control pressure chamber 12. As long as there are no abrupt changes in control pressure, the same pressure prevails in the relief work chamber as in the control pressure chamber 4.

Now in order to adjust the onset of injection, the valve 42 is opened in response to an appropriate acceleration signal, so that the compensation work chamber 37 is relieved of pressure. The hydraulic force exerted upon the stepped piston section 32 is correspondingly greater, so that the injection adjustment piston 1' is displaced still further counter to the force of the restoring spring 5. Thus values are attained for onset of injection which are located, for instance, at 20° before top dead center.

In this embodiment, the acceleration signal is obtained by electrical means in an advantageous manner. The voltage picked up at the potentiometer 44 is differentiated and compared with a minimum value characterizing the load change beyond which an adjustment of injection onset is necessary. Upon exceeding this setpoint value, a timing device is set, over the operating time of which the magnetic valve 42 is opened.

With the aid of the timing device, a minimum duration of the injection onset adjustment advantageously can also be established during accelerations of brief duration, with this duration of injection onset adjustment being in proportion to the time and inertia behavior of the turbocharger. Naturally the acceleration signal also can be obtained as an analog signal with an appropriately embodied control device 43 and the valve 42 can be opened analogously to this signal. This is particularly advantageous because it makes it possible to take into account changes in load which are both rapid and large in extent.

A further possibility for control intervention in adjusting the onset of injection is in varying the restoring force on the injection adjustment piston. Here, the initial tension of the restoring spring 5 can be varied, for instance by electrical or electronic means. Devices for varying the restoring spring are known, for instance from German Offenlegungsschrift No. 27 16 307; however, the restoring force in that case is varied in accordance with the operating temperature of the engine.

In the above exemplary embodiments, the acceleration signal was attained either electrically or hydraulically. A further possibility for obtaining the signal is to use the pressure increase before the turbine of the exhaust turbocharger in the acceleration phase as a control value. Just as the pressure drops downstream of the turbocharger, so the exhaust counterpressure increases before the turbine, as a result of the sluggish behavior of the exhaust turbocharger, whenever there is an increased expulsion of gas as a result of a fuel enrichment. This behavior is shown in diagram form in FIG. 5, with time $t_1$ marking the onset of acceleration.

FIG. 4 illustrates an apparatus for obtaining the acceleration signal. A pneumatic servomotor is provided, which in the illustrated embodiment is a pressure box 47 and in which an adjusting diaphragm 48 encloses a control pressure chamber 49. The control pressure chamber 49 communicates with the exhaust pipe of the engine upstream of the turbine of the exhaust turbocharger. On the side of the diaphragm 48 remote from the control pressure chamber 49, the diaphragm is stressed by a compression spring 51 supported on the housing 50 of the pressure box 47. A transmission member 52 in the form of an actuation rod is firmly connected with the diaphragm 48, being guided in a sealed manner out of the control pressure chamber and having a valve closing member 53 on its opposite end. The valve closing member 53 cooperates with a valve seat 54, which is formed by the end of a second relief line 41' discharging into a collector line 55 leading to the fuel supply container. This relief line 41' corresponds to the second relief line 41 of the embodiment shown in FIG. 3. The valve 42 and control device 43 provided in that embodiment can be replaced by the embodiment shown in FIG. 4. The differentiation effect is brought about in this case by the communication of the control pressure chamber 49, via a throttle bore 56, with the atmosphere. The throttle bore may either be disposed in the diaphragm 48, in which case the chamber including the compression spring 51 communicates via an aperture 57 with the atmosphere, or the throttle bore can be provided directly in the housing wall defining the control pressure chamber 49. The throttle assures that the diaphragm 48 is deflected, beyond a certain magnitude of dynamic change of the exhaust counterpressure, and the second relief line 41' is opened toward the fuel collection container.

FIG. 6 shows a further embodiment of the examples according the invention discussed at the outset. In an engine driven with an exhaust turbocharger, a full-load stop adjustable in accordance with charge pressure, also called a manifold-pressure compensator, is provided in the injection pump for the purpose of adaptation of the injection quantity. As a result of this feature, as described at the outset, the injectable fuel quantity is greatly reduced during acceleration in accordance with the low charge pressure. As a result of the above-described adjustment of the injection onset, it was possible to attain higher power outputs in the engine, with an identical fuel injection quantity. The output during acceleration can be still further increased, however, by injecting somewhat more fuel than would be predetermined by the full-load stop controlled in accordance with charge pressure. The adjustment apparatus for the full-load stop is designed such that a sufficiently great safety margin is kept to prevent smoking combustion. From FIG. 1 it can be seen that in the case of an adjustment of the injection onset toward "early" the permissible smoke limit approaches closer to an air number $\lambda = 1.0$. In this sense it is possible to supply somewhat more fuel to the aspirated air, and this can make a further contribution toward increasing power output in accordance with the invention. Accordingly, in the apparatus shown in FIG. 6 the control variable of the manifold-pressure compensator is affected simultaneously with the acceleration signal. The full-load stop here has a pneumatic servomotor 59 in the form of a pressure box, in which an adjusting diaphragm 60 encloses a pressure chamber 61 which communicates via a throttle 62 with the intake tube 63 of the engine downstream of the turbocharger. The adjusting diaphragm 60 is stressed on the side remote from the pressure chamber 61 by a restoring spring 64 and is firmly connected with an actuation member 66, which adjusts the full-load stop of the injection pump 67 in a known manner. An adjustable stop 68 provided in the pressure chamber 61 prevents an excessive adjustment of the full-load stop or an excessive leaning down of the fuel mixture when there is no pressure in the pressure chamber. To this extent, this exemplary embodiment corresponds to the conventional embodiment of a charge-pressure-controlled full-load stop or manifold-pressure compensator.

The pressure chamber 61 further communicates with the atmosphere via a discharge line 69. A second throttle 70 is provided in the discharge line 69, and there is a further valve 71 downstream, which is embodied by way of example as a magnetic valve. This magnetic valve, in the same manner as the magnetic valve 42 in the embodiment of FIG. 3, receives a control signal from the control device 43 and is closed when this control signal is present.

The apparatus functions as follows:

When the valve 71 is open, the adjustment characteristic of the manifold-pressure compensator is fixed with the aid of the throttles 62 and 70 and the effective diaphragm surface area of the adjusting diaphragm 60 in proportion to the force of the restoring spring 64. An average pressure value determined by the pitch ratio of the throttles 62 and 70, that is by the ratio of the different minimum cross sectional areas of the throttles 62 and 70, is established in the pressure chamber 61, which is lower than the maximum charge pressure prevailing at that time so long as the valve 71 is opened. By closing this valve 71, the full charge pressure reaches the pressure chamber 61, as a result of which a higher charge pressure per se is simulated, and the full-load stop is adjusted in accordance with this simulated charge pressure. As a result of this embodiment, a supplementary amount of torque is obtained by increasing the injection quantity during the acceleration phases, without great additional expense.

The foregoing relates to three preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. Apparatus for improving the acceleration behavior of a self-igniting internal combustion engine driven with an exhaust turbocharger supplied with fuel by an injection pump, comprising means for testing during the operational mode of the engine as to whether a status of acceleration of a predetermined order of magnitude is present or should be established and that for this operational case, means for generating an acceleration signal in accordance with which the onset of injection is adjusted toward "early".

2. Apparatus defined by claim 1, wherein in the presence of the generated acceleration signal, the injection quantity is additionally increased by means responsive to an adjustable amount.

3. An apparatus defined by claim 1, wherein means for detecting a load-change speed and for generating an acceleration signal corresponding to this load-change speed is provided and that the acceleration signal is supplied as a control variable to an apparatus for adjusting the onset of injection toward "early".

4. An apparatus defined by claim 3, wherein a timing device with an adjustable operation time is started by means of and in response to the acceleration signal, its output being connected with the injection onset adjustment device.

5. An apparatus defined by claim 4, wherein the injection onset adjustment device has an injection adjustment piston connected with the supply onset adjustment device of the injection pump, which piston is subjected, counter to the restoring force of a spring, to a control pressure varying in accordance with the rpm and that the pressure of the control pressure can be increased in accordance with the acceleration signal.

6. An apparatus defined by claim 5, wherein a pump piston is connected with a gas pedal, the work chamber of which pump piston communicates with the control pressure chamber of the injection adjustment piston and that the work chamber is in continuous communication via at least one throttle with the control pressure source and the work chamber of the pump piston can be made to communicate with the control pressure source via a check valve opening in the direction of the work chamber.

7. An apparatus defined by claim 6, wherein a stop limiting the deflection distance of the injection adjustment piston and a pressure-limiting valve are provided in a connecting line between the system comprising the control pressure chamber and work chamber and a relief chamber, wherein the pressure-limiting valve opens in the direction of the relief chamber.

8. An apparatus defined by claim 6, wherein the transmission member is connected with the valve relieving the compensation work chamber and when as a result of an abrupt increase in exhaust pressure the adjustment member is deflected counter to the force of the spring the transmission member is displaced in such a way as to cause the opening of the valve.

9. An apparatus defined by claim 4, wherein in accordance with the acceleration signal a portion of the surface area of the injection adjustment piston upon which the control pressure is exerted can be brought into play or withdrawn from effectiveness.

10. An apparatus defined by claim 9, wherein the injection adjustment piston is embodied as a stepped piston the larger piston section of which, within a cylinder closed on both ends, encloses on one end the control pressure chamber, which communicates continuously with the control pressure source, and on the other end an annular compensation work chamber is enclosed in the cylinder between the smaller piston section and the larger piston section, which compensation work chamber communicates continuously via a throttle with the control pressure source and can be relieved of pressure via a valve controllable in accordance with the acceleration signal.

11. An apparatus defined by claim 10, wherein the relief valve is an electromagnetic valve and is controlled by a control device, which in order to generate the acceleration signal differentiates the load change by electrical means.

12. An apparatus defined by claim 4, wherein the initial tension of the restoring spring is variable in accordance with the acceleration signal.

13. An apparatus defined by claim 3, wherein an acceleration signal is generated by the detecting means, the duration of which signal is dependent on the magnitude of the load-change speed.

14. An apparatus defined by claim 1, wherein the exhaust pressure before the turbine of the charging device is used as the load-change signal and an acceleration signal is obtained as a control variable by means of differentiation based on the pressure change of this exhaust pressure.

15. An apparatus defined by claim 14, wherein a pneumatic servomotor acts as the differentiation element and adjustment member for the variation of the onset of injection, in which servomotor a spring-loaded adjustment member encloses a control pressure chamber communicating continuously via a throttle with the ambient air, wherein the control pressure chamber communicates with the exhaust pipe upstream of the turbine and a transmission member is secured to the adjustment member.

16. An apparatus defined by claim 1, wherein an apparatus for varying the injection quantity (manifold-pressure compensator) is simultaneously actuated by means of the acceleration signal in the direction of an increased quantity.

17. An apparatus defined by claim 16, wherein a full-load stop means controlled in accordance with charge pressure, known per se and called a manifold-pressure compensator, is provided as the device for generating an increased quantity.

18. An apparatus defined by claim 17, wherein the charge-pressure-dependent full-load stop has a pneumatic servomotor, whose spring-loaded adjustment member encloses a pressure chamber which communicates via a throttle with the intake tube of the engine downstream of the turbocharger and via a second throttle and a switching valve with the ambient air and that the switching valve is closed in the presence of the acceleration signal.

19. An apparatus for improving the acceleration behavior of a self-igniting internal combustion engine having a fuel injection pump with onset control and being driven with an exhaust turbo-charger comprising means for detecting speed at which the engine load changes,
    means generating an acceleration signal corresponding to said detected speed,
    means supplying said acceleration signal as a control variable for onset control of the injection pump; and
    means adjusting the onset of injection.

20. An apparatus defined by claim 19, wherein said means generating said acceleration signal is arranged to start a timing device, the output of said timing device being connected with said injection onset adjusting means.

* * * * *